US008913821B1

(12) United States Patent
Agarwal et al.

(10) Patent No.: US 8,913,821 B1
(45) Date of Patent: Dec. 16, 2014

(54) PRECONDITIONER FOR SOLVING LINEAR EQUATIONS FOR RECONSTRUCTING THREE-DIMENSIONAL STRUCTURE OF A SCENE

(71) Applicant: Google Inc., Mountain View, CA (US)

(72) Inventors: Sameer Agarwal, Lake Forest Park, WA (US); Avanish M. Kushal, Seattle, WA (US)

(73) Assignee: Google Inc., Mountian View, CA (US)

( * ) Notice: Subject to any disclaimer, the term of this patent is extended or adjusted under 35 U.S.C. 154(b) by 178 days.

(21) Appl. No.: 13/626,453

(22) Filed: Sep. 25, 2012

Related U.S. Application Data

(60) Provisional application No. 61/539,437, filed on Sep. 26, 2011, provisional application No. 61/667,342, filed on Jul. 2, 2012.

(51) Int. Cl.
*G06K 9/00* (2006.01)
*G06K 9/32* (2006.01)

(52) U.S. Cl.
USPC .......................................... 382/154; 382/294

(58) Field of Classification Search
None
See application file for complete search history.

(56) References Cited

U.S. PATENT DOCUMENTS

| 6,157,747 | A | 12/2000 | Szeliski et al. |
| 2008/0025633 | A1* | 1/2008 | Szeliski .................. 382/274 |
| 2010/0208035 | A1* | 8/2010 | Pinault et al. ................ 348/46 |
| 2013/0127847 | A1 | 5/2013 | Jin et al. |
| 2013/0181989 | A1 | 7/2013 | Agarwal et al. |

OTHER PUBLICATIONS

Agarwal et al, Building Rome in a Day, 2009, IEEE 12th International Conference on Computer Vision (ICCV), pp. 72-79.*
Yan et al, Estimation of Camera Positions over Long Image Sequences, 2010, ICGST Graphics, Vision and Image Processing, vol. 10, issue V, pp. 1-8.*
Chen, Y., et al., "Algorithm 887: CHOLMOD, Supernodal Sparse Cholesky Factorization and Update/Downdate," ACM Transactions on Mathematical Software, TOMS, Oct. 2008, pp. 22:1-22:14, vol. 35, No. 3, Article 22.
Levenberg, K., "A method for the solution of certain nonlinear problems in least squares," Quart. Appl. Math, 1944, pp. 164-168, vol. 2, No. 2.
Li, N., et al., "MIQR: A multilevel incomplete QR preconditioner for large sparse least-squares problems," SIAM Journal on Matrix Analysis and Applications, 2006, pp. 524-550, vol. 28.

(Continued)

*Primary Examiner* — Brian P Werner
*Assistant Examiner* — David F Dunphy
(74) *Attorney, Agent, or Firm* — Lerner, David, Littenberg, Krumholz & Mentlik, LLP

(57) ABSTRACT

A three-dimensional model of a scene is reconstructed from images of the scene. The three-dimensional model comprises parameters describing points of the scene and cameras that captured the scene. The parameters are iteratively modified by adding a correction to the parameters in each iteration. A preconditioner matrix is determined for solving the linear system of equations. To determine the preconditioner matrix, cameras that observed the scene are clustered, each cluster including cameras that observed a portion of the scene. The preconditioner matrix is determined by selectively eliminating terms of the linear system of equations that correspond to interactions across clusters of cameras. The linear system of equations is preconditioned using the preconditioner matrix. The preconditioned linear system of equations is solved to obtain the corrections to the parameters.

19 Claims, 16 Drawing Sheets

(56) References Cited

OTHER PUBLICATIONS

Lourakis, M.I.A., et al., "SBA: A software package for generic sparse bundle adjustment," ACM Transactions on Mathematical Software, TOMS, Mar. 2009, pp. 2:1-2:30, vol. 36, No. 1, Article 2.

Marquardt, D.W., "An algorithm for least-squares estimation of non-linear parameters," Journal of the Society for Industrial and Applied Mathematics, 1963, pp. 431-441, vol. 11, No. 2.

Ranganathan, A., "The Levenberg-Marquardt Algorithm," Jun. 8, 2004, 5 pages. Can be retrieved at <URL:http://ananth.in/docs/lmtut.pdf>.

Triggs, B., et al., "Bundle Adjustment—A modern synthesis," In Vision Algorithms '99, Theory * Practice, 1999, pp. 298-372.

Tordable, J., "Bundle Adjustment Refinement of Scenes with Moving Cameras," Aug. 30, 2009, 21 Pages, can be retrieved at <URL:http://www.javiertordable.com/files/BundleAdjustmentMovingCameras.pdf>.

Shirley, K., et al., "Multivariable Calculus Online" Adapted from the textbook Calculus: A Modern Approach by Kevin Shirley and Jeff Knisley, 2001, 17 Pages.

Agarwal, S., et al., "Building Rome in a day," IEEE 12th International Conference on Computer Vision (ICCV) 2009, pp. 72-79.

Agarwal, S., et al., "Bundle adjustment in the large," In ECCV, Part II, pp. 29-42, 2010.

Byrod, M., et al., "Bundle adjustment using conjugate gradients with multiscale preconditioning," In BMVC, 2009, pp. 1-10.

Jeong, Y., et al., "Pushing the envelope of modern methods for bundle adjustment," In CVPR, 2010, pp. 1474-1481.

Lourakis, M., et al., "Is Levenberg-Marquardt the most efficient optimization algorithm for implementing bundle adjustment," Proceedings of the Tenth IEEE International Conference on Computer Vision (ICCV'05), 2005, pp. 1526-1531.

Ni, K., et al., "Out-of-core bundle adjustment for large-scale 3d reconstruction," In ICCV, 2007, 8 Pages.

Wu, C., et al., "Multicore bundle adjustment," In CVPR, 2011, pp. 3057-3064.

\* cited by examiner

PRECONDITIONER FOR SOLVING LINEAR EQUATIONS FOR RECONSTRUCTING THREE-DIMENSIONAL STRUCTURE OF A SCENE

CROSS REFERENCES TO RELATED APPLICATIONS

This application claims the benefit of U.S. Provisional Application No. 61/539,437, filed Sep. 26, 2011, and U.S. Provisional Application No. 61/667,342, filed Jul. 2, 2012, each of which is incorporated by reference in its entirety.

FIELD OF THE INVENTION

This invention relates in general to reconstructing a three-dimensional structure of a scene from a given set of images, and more specifically to using a preconditioner for solving linear equations for reconstructing the three-dimensional structure.

BACKGROUND

Given a set of images of a scene, numerical techniques can be used to reconstruct the three-dimensional structure of the scene and parameters describing the cameras that captured the images. The three-dimensional structure can be represented as three-dimensional positions of points in the scene. The parameters describing the cameras that captured the images include the positions, orientations, and focal lengths of the cameras. The problem of reconstructing the three-dimensional structure and parameters describing cameras of a scene from images of the scene is called the "bundle adjustment problem." The bundle adjustment problem can be formulated as a non-linear least squares minimization problem.

The images used for three-dimensional structure reconstruction can be sequences of images captured from a moving camera, for example, a camera mounted on a car, a low flying aircraft, or a hand-pushed trolley in a building. For several applications, the number of photos processed for three-dimensional reconstruction can be tens of thousands or more. Furthermore, the number of points processed in the scene can be hundreds or thousands or more. As a result, the size of the matrices that are processed during the three-dimensional reconstruction process can be very large. Therefore, conventional techniques for three-dimensional reconstruction from images can be inefficient.

SUMMARY

The above and other issues are addressed by a computer-implemented method, computer system, and computer program product for constructing a three-dimensional model for a scene from images of the scene. The three-dimensional model comprises a set of parameters describing the scene and the cameras that captured the scene. Embodiments of the method iteratively refine the three-dimensional model of the scene by correcting the parameters in each iteration. The corrections to the parameters are obtained by solving a linear system of equations. Solving the linear system of equations comprises formulating a linear system of equations that represent an error in the three dimensional model. Clusters of cameras are determined such that each cluster comprises cameras that observed a portion of the scene. A preconditioner matrix is determined by eliminating one or more terms that represent observations of a portion of scene associated with one cluster by cameras of another cluster. The linear system of equations is preconditioned using the preconditioner matrix and the preconditioned linear system of equations is solved to determine the corrections to the parameters. The corrections to the parameters are used to refine the set of parameters to produce a refined three-dimensional model of the scene. The refined three-dimensional model is saved.

Embodiments of the computer system for refining a three-dimensional model for a scene from images of the scene comprise a computer processor and a computer-readable storage medium storing computer program modules. The computer program modules comprise a model correction module and a three-dimensional construction module. The model construction module is configured to iteratively modify a set of parameters representing a three-dimensional model of the scene. The model correction module iteratively refines the three-dimensional model of the scene by adding corrections to the parameters. The model correction module determines corrections to the parameters by solving a linear system of equations. The linear system of equations is solved by formulating a linear system of equations that represents the error in the three-dimensional model. Clusters of cameras are determined such that each cluster comprises cameras that observed a portion of the scene. A preconditioner matrix is determined by eliminating one or more terms that represent observations of a portion of scene associated with one cluster by cameras of another cluster. The linear system of equations is preconditioned using the preconditioner matrix and the preconditioned linear system of equations is solved to determine the correction to the parameters. The corrections to the parameters are used to refine the set of parameters to produce a refined three-dimensional model of the scene. The three-dimensional construction module saves the refined three-dimensional model.

Embodiments of the computer program product for refining a three-dimensional model for a scene from images of the scene have a computer-readable storage medium storing computer-executable code for constructing the three-dimensional model. The computer-executable code comprises computer program modules including a three-dimensional model construction module and a model correction module. The model construction module is configured to iteratively modify a set of parameters representing a three-dimensional model of the scene. The model correction module iteratively refines the three-dimensional model of the scene by adding corrections to the parameters. The model correction module obtains corrections to the parameters by solving a linear system of equations. The linear system of equations is solved by formulating a linear system of equations that represents the error in the three-dimensional model. Clusters of cameras are determined such that each cluster comprises cameras that observed a portion of the scene. A preconditioner matrix is determined by eliminating one or more terms that represent observations of a portion of scene associated with one cluster by cameras of another cluster. The linear system of equations is preconditioned using the preconditioner matrix and the preconditioned linear system of equations is solved to determine the correction to the parameters. The corrections to the parameters are used to refine the set of parameters to produce a refined three-dimensional model of the scene. The three-dimensional construction module saves the refined three-dimensional model.

The features and advantages described in this summary and the following detailed description are not all-inclusive. Many additional features and advantages will be apparent to one of ordinary skill in the art in view of the drawings, specification, and claims hereof.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

Figure 1:
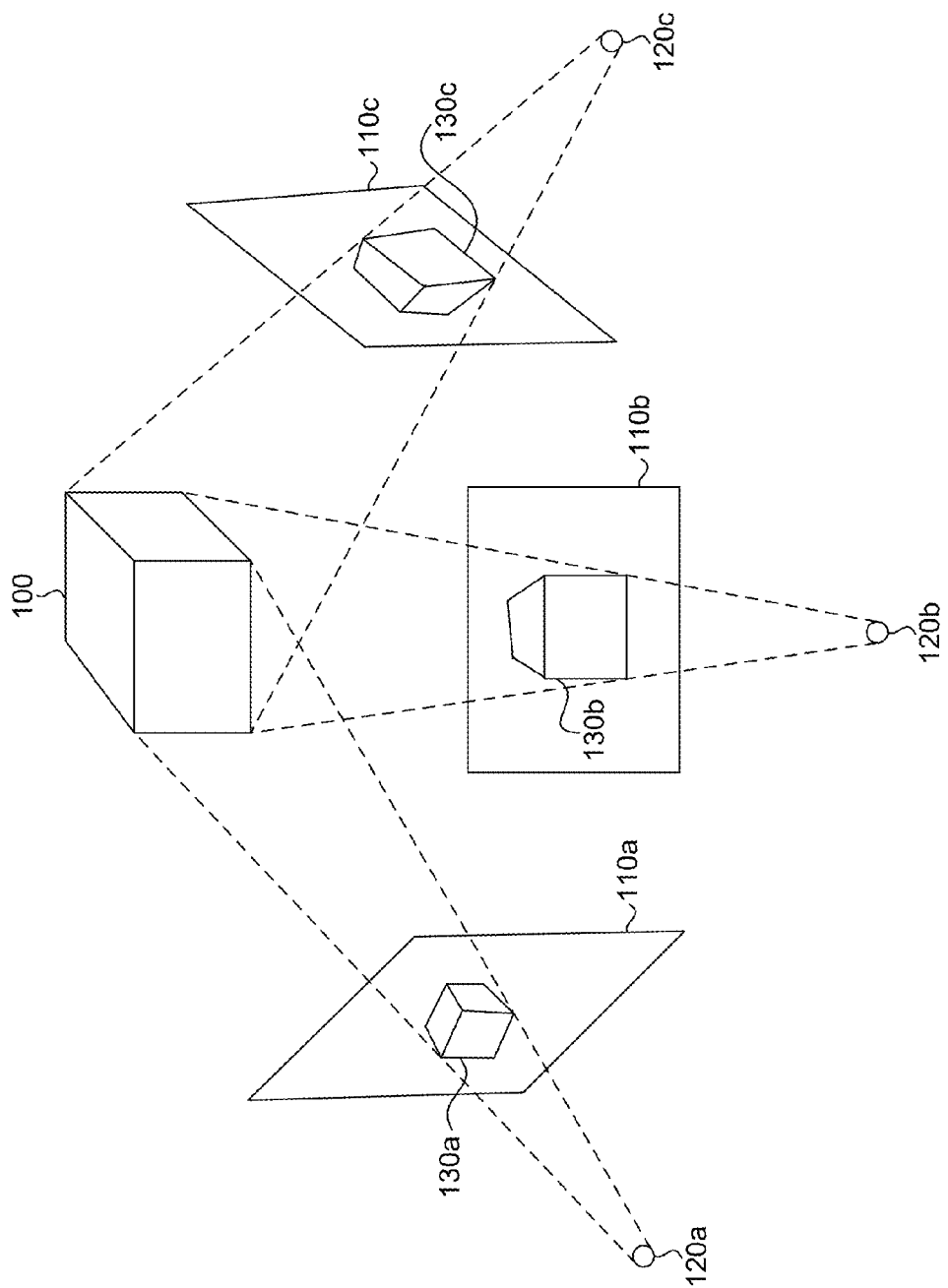
FIG. 1 illustrates how multiple images of a scene showing an object can be captured by cameras.

FIG. 1 and the other figures use like reference numerals to identify like elements. A letter after a reference numeral, such as "120a," indicates that the text refers specifically to the element having that particular reference numeral. A reference numeral in the text without a following letter, such as "120," refers to any or all of the elements in the figures bearing that reference numeral (e.g. "120" in the text refers to reference numerals "120a" and/or "120b" in the figures).

FIG. 1 illustrates how multiple images of a scene showing an object can be captured by cameras. The images 110 of a scene 100 are captured using cameras 120a, 120b, and 120c. Each camera 120 may capture an image 110 of the scene 100 from a different angle. Since each image may be captured from a different angle, each image 110 may show a view 130 of the scene that is different from the view in other images 110. For example, the view 130a captured by camera 120a is different from the view 130b captured by camera 120b, which in turn is different from the view 130c captured by camera 120c. In an embodiment, the same camera may be used to capture multiple images of a scene from different angles. For example, a moving camera may be used to capture images of a scene. The cameras used for capturing the images can be described by various parameters including their locations, orientations, and focal lengths. Other parameters related to cameras include parameters of mechanical devices on which the camera is mounted, for example, parameters describing a servo motor on which a camera may be mounted.

Figure 2:
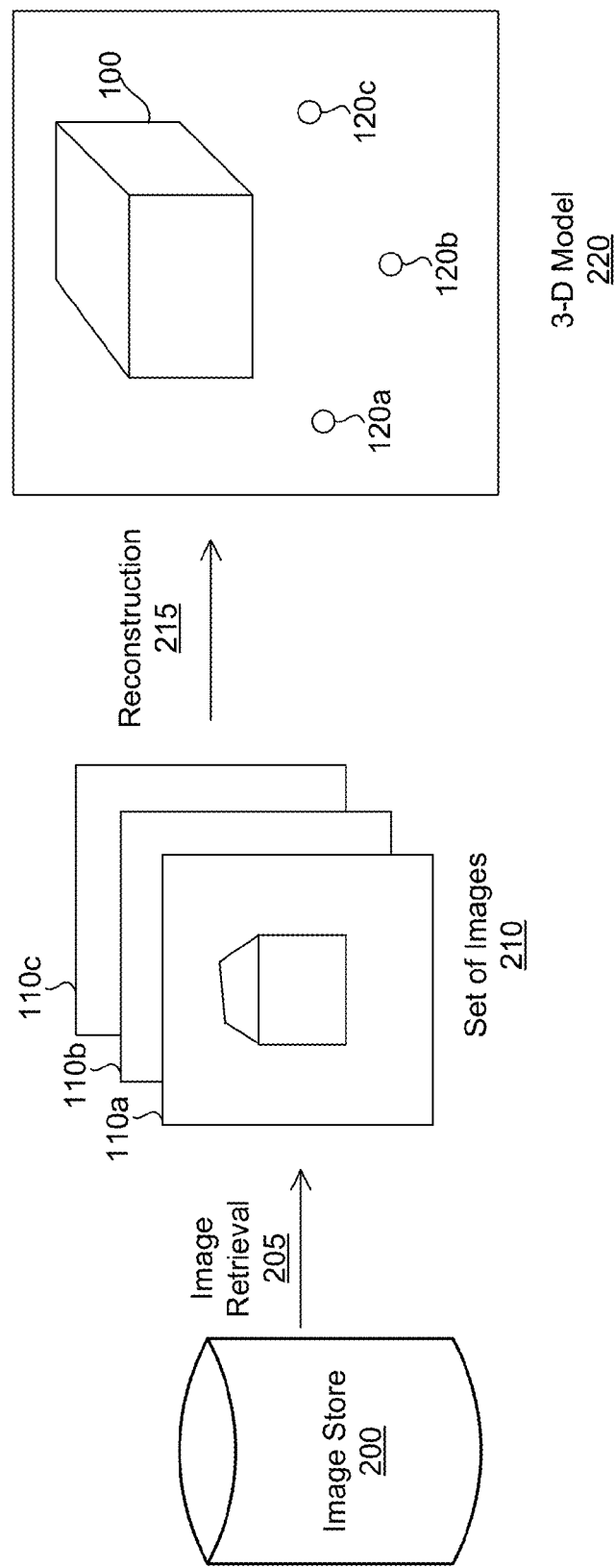
FIG. 2 illustrates the process of reconstructing a three-dimensional structure of a scene and parameters of cameras used for capturing images of the scene given a set of images of the scene, according to one embodiment of the present invention.

FIG. 2 illustrates the process of reconstructing a three-dimensional structure of a scene and parameters of cameras used for capturing images of the scene given a set of images of the scene, according to one embodiment of the present invention. The three-dimensional structure of a scene and information describing the cameras used for capturing the images can be represented by a three-dimensional model 220. The images of different scenes captured as shown in FIG. 1 can be stored in an image store 200. The set 210 of images of a scene 100 are retrieved 205 from the image store 200. The set 210 of images 110 are processed to perform a reconstruction 215 of the three-dimensional structure of the scene represented as a three-dimensional model 220. The three-dimensional model 220 comprises information describing the scene 100 and information describing the cameras 120. The scene may be described using points. A point corresponds to a three-dimensional location in the scene that is typically visible as a feature of the scene. A point may be visible in one or more images and may correspond to pixels in the images that show the point. A point of the scene may correspond to an object of the scene. For example, a scene may show a three dimensional cube that has points corresponding to the corners, points corresponding to the edges, or points corresponding to the faces of the cube. A point need not correspond to an object of the scene. For example, a point may correspond to a shadow in a scene or a portion of a scene displaying certain texture. The information describing the scene 100 comprises information describing the points of the scene, for example, three-dimensional positions of the points. The information describing the cameras may comprise the position, orientation, and focal length of the cameras 120 used to capture the images 110.

Formulation of Three-Dimensional Reconstruction Process

The following discussion describes the mathematical underpinnings used by the three-dimensional model construction module 310 to perform three-dimensional reconstruction. The three-dimensional model 220 is represented as a block-structured vector x called a "parameter vector" as defined by equation (1). In equation (1), each $x_i$ is a vector of scalars and is called a parameter block. Each parameter block typically comprises 1 to 10 components. The vector x typically has from a few hundred thousand to millions of parameter blocks.

$$x = \begin{bmatrix} x_1 \\ \vdots \\ x_n \end{bmatrix} \quad (1)$$

The three-dimensional reconstruction problem can be formulated as a non-linear least squares minimization process. The non-linear least squares minimization process minimizes an estimate of an error in the three-dimensional model 220. The error in the three-dimensional model 220 can be represented as a residual vector comprising the differences between projections of the points of the scene 100 represented by the three-dimensional model 220 onto the image planes of the cameras and the actual positions of the points in the corresponding images. An example of a metric based on the estimate of the error is the squared $L_2$ norm of the residual vector.

The residual representing the error in the three-dimensional model 220 can be represented as a residual vector $F(x)$ as shown in equation (2). The residual vector $F(x)$ comprises individual elements $f_i(x)$, where each $f_i(x)$ is referred to as a residual block.

$$F(x) = \begin{bmatrix} f_1(x) \\ \vdots \\ f_m(x) \end{bmatrix} \quad (2)$$

A residual block $f_i(x)$ represents the error between observations in images and the current estimate of the three-dimensional point being observed in that image and the camera parameters for that image. Residual blocks are vectors that typically have from 1 to 6 elements. The value of m can vary from hundreds of thousands for medium scale problems to tens of millions for large problems.

The process of minimizing the error for performing the three-dimensional reconstruction process 215 can be represented as the process of minimizing the $L_2$ norm of $F(x)$ as represented by the expression in equation (3).

$$\min_x \frac{1}{2} \|F(x)\|^2 \quad (3)$$

The non-linear optimization problem represented by equation (3) can be solved by solving a sequence of approximations to the original problem. At each iteration, the approximation is solved to determine a correction $\Delta x$ to the vector x. For non-linear least squares, the term $F(x)$ can be approximated by using the linearization $F(x+\Delta x) \approx F(x) + J(x)\Delta x$, where $J(x)$ is the Jacobian of $F(x)$. The matrix $J(x)$ is a block structured matrix and comprises terms $J_{ij}(x) = \partial_j f_i(x)$ where each $J_{ij}(x)$ is the Jacobian of the $i^{th}$ residual block with respect to the $j^{th}$ parameter block. The term $J_i$ represents a row block, corresponding to the Jacobian of the $i^{th}$ residual block. Typically, $J(x)$ is an extremely sparse matrix. Each residual block $f_i(x)$ depends on a very small number of parameter blocks, typically 1 to 5 blocks.

Using the linearization $F(x+\Delta x) \approx F(x) + J(x)\Delta x$, equation (3) can be approximated by equation (4).

$$\min_x \frac{1}{2} \|J(x)\Delta x + F(x)\|^2 \quad (4)$$

However, solving a sequence of these problems naively and updating x by $(x+\Delta x)$ leads to a process that may not converge. In order to ensure that the process converges, the size of the step $\Delta x$ is controlled, for example, by introducing a regularization term as shown in equation (5).

$$\min_{\Delta x} \frac{1}{2} \|J(x)\Delta x + F(x)\|^2 + \mu \|D(x)\Delta(x)\|^2 \quad (5)$$

In equation (5), $D(x)$ is a non-negative diagonal matrix, typically the square root of the diagonal of the matrix $J(x)^T J(x)$ and $\mu$ s a non-negative parameter that controls the strength of regularization. It can be shown that the step size $\|\Delta(x)\|$ is inversely related to $\mu$. The value of $\mu$ is updated at each step based on how well the Jacobian $J(x)$ approximates $F(x)$. The quality of this fit is measured by the ratio of the actual decrease in the objective function to the decrease in the value of the linearized model $$L(\Delta x) = \frac{1}{2} \|J(x)\Delta x + F(x)\|^2.$$

The dominant computational cost in each iteration of the non-linear optimization of the term represented by equation (3) is the solution of the linear least squares problem represented by equation (5). The equation (5) can be transformed into equation (6).

$$\min_{\Delta x} \frac{1}{2} \left\| \begin{bmatrix} J \\ \sqrt{2\mu}D \end{bmatrix} \Delta x + \begin{bmatrix} f \\ 0 \end{bmatrix} \right\|^2 \quad (6)$$

For purposes of simplifying the notation, it is assumed that the matrix $$\sqrt{2\mu D}$$

is concatenated at the bottom of the matrix J and a vector of zeros is added to the bottom of the vector f. Accordingly, equation (6) can be transformed into equation (7).

$$\min_{\Delta x} \frac{1}{2} \|J(x)\Delta x + F(x)\|^2 \quad (7)$$

If the vector x represented in equation (1) comprises $n_p$ points and $n_c$ cameras, the parameter blocks can be ordered such that all the parameter blocks representing points are ordered before the parameter blocks representing cameras. As a result of this reordering, the vector x can be represented as shown in equation (8), where $\{x_1, \ldots x_{n_p}\}$ are the parameter blocks for the points (called the point parameter blocks) and $\{x_{n_p+1}, \ldots, x_{n_p+n_c}\}$ are the parameter blocks for the cameras (called the camera parameter blocks).

$$x = \begin{bmatrix} x_1 \\ \vdots \\ x_{n_p} \\ x_{n_p+1} \\ \vdots \\ x_{n_p+n_c} \end{bmatrix} \quad (8)$$

The residual vector F(x) can be sorted in order of the point parameter blocks such that all residual blocks that depend on a particular point are grouped together. Equation (9) shows an example of the Jacobian matrix J for a three-dimensional reconstruction process based on 5 points and 3 cameras. As shown in equation (9), $Q_{i,j}$ refers to a non-zero Jacobian block representing observation i corresponding to point parameter block of point j. Furthermore, $K_{i,k}$ refers to a non-zero Jacobian block corresponding to camera parameter block of camera k used to capture observation i. Each term $Q_{i,j}$ may correspond to a 2×3 matrix such that each row corresponds to a coordinate of a 2-D observation and each column corresponds to the point parameters associated with the three-dimensional representation of the point. Similarly, each term $K_{i,k}$ may correspond to a 2×7 matrix such that each row corresponds to a coordinate of a 2-D observation and each column corresponds to camera parameters associated with the camera, assuming there are 7 parameters of the camera.

$$J = \begin{bmatrix} Q_{1,1} & 0 & 0 & 0 & 0 & K_{1,1} & 0 & K_{1,3} \\ Q_{2,1} & 0 & 0 & 0 & 0 & 0 & K_{2,2} & 0 \\ Q_{3,1} & 0 & 0 & 0 & 0 & 0 & 0 & K_{3,3} \\ 0 & Q_{4,2} & 0 & 0 & 0 & 0 & K_{4,2} & 0 \\ 0 & Q_{5,2} & 0 & 0 & 0 & K_{5,1} & 0 & 0 \\ 0 & 0 & Q_{6,3} & 0 & 0 & K_{6,1} & K_{6,2} & 0 \\ 0 & 0 & Q_{7,3} & 0 & 0 & 0 & K_{7,2} & 0 \\ 0 & 0 & Q_{8,3} & 0 & 0 & 0 & 0 & K_{8,3} \\ 0 & 0 & Q_{9,3} & 0 & 0 & 0 & 0 & K_{9,3} \\ 0 & 0 & 0 & Q_{10,4} & 0 & K_{10,1} & 0 & 0 \\ 0 & 0 & 0 & 0 & Q_{11,5} & 0 & K_{11,2} & 0 \\ 0 & 0 & 0 & 0 & 0 & K_{12,1} & 0 & K_{12,3} \\ 0 & 0 & 0 & 0 & 0 & 0 & K_{13,2} & K_{13,3} \\ 0 & 0 & 0 & 0 & 0 & K_{14,1} & K_{14,2} & 0 \end{bmatrix} \quad (9)$$

The matrix J shown in equation (9) can be represented as J=[P C] by vertically partitioning J into two matrices P and C. The Jacobian matrix J can be written as shown in equation (10), where each $P_i$ contains Jacobian blocks corresponding to the point parameter blocks for point i. Similarly, each $C_i$ corresponds to Jacobian blocks corresponding to camera parameter blocks for point i. As shown in equations (10), the matrix P is block diagonal matrix and matrix C is a general block sparse matrix.

$$J = \begin{bmatrix} P_1 & 0 & 0 & 0 & 0 & C_1 \\ 0 & P_2 & 0 & 0 & 0 & C_2 \\ 0 & 0 & P_3 & 0 & 0 & C_3 \\ 0 & 0 & 0 & P_4 & 0 & C_4 \\ 0 & 0 & 0 & 0 & P_5 & C_5 \\ 0 & 0 & 0 & 0 & 0 & C_6 \end{bmatrix} \quad (10)$$

For example, in equation (10), $$P_3 = \begin{bmatrix} Q_{6,3} \\ Q_{7,3} \\ Q_{8,3} \\ Q_{9,3} \end{bmatrix} \text{ and } C_3 = \begin{bmatrix} K_{6,1} & K_{6,2} & 0 \\ 0 & K_{7,2} & 0 \\ 0 & 0 & K_{8,3} \\ 0 & 0 & K_{9,3} \end{bmatrix}.$$

Solving for the equation (11) for $$J\Delta x = f \quad (11)$$

Then this rectangular linear system can be shown to be equivalent to solving the normal equations (12) and (13).

$$J^T J \Delta x = J^T f \quad (12)$$

$$H \Delta x = g \quad (13)$$

The equation (13) is obtained by assuming $g = J^T f$ in equation (12), where $$g = \begin{bmatrix} g_p \\ g_c \end{bmatrix},$$

and the portion $g_p$ comprises the values corresponding to the point parameters and $g_c$ comprises the values corresponding to the camera parameters. Similarly, $\Delta x_p$ comprises the values of the correction to the point parameters and $\Delta x_c$ comprises the values of the correction to the camera parameters.

$$\begin{bmatrix} P^T P & P^T C \\ C^T P & C^T C \end{bmatrix} \begin{bmatrix} \Delta x_p \\ \Delta x_c \end{bmatrix} = \begin{bmatrix} g_p \\ g_c \end{bmatrix} \quad (14)$$

Equation (14) is a system of equations that can be represented as individual equations (15) and (16).

$$P^T P \Delta x_p + P^T C \Delta x_c = g_p \quad (15)$$

$$C^T P \Delta x_p + C^T C \Delta x_c = g_c \quad (16)$$

The linear systems of equations (15) and (16) can be transformed into the equations (17) and (18).

$$[C^T C - C^T P [P^T P]^{-1} P^T C] \Delta x_c = g_c - C^T P [P^T P]^{-1} g_p \quad (17)$$

$$[C^T C - C^T P [P^T P]^{-1} P^T C] \Delta x_c = [C^T - C^T P [P^T P]^{-1} P^T] f \quad (18)$$

The matrix $S = C^T C - C^T P [P^T P]^{-1} P^T C$ is referred to as the Schur complement. The equation (18) can be represented as $S \times \Delta x_c = R$, where R is a vector obtained by equation (19), $$R = [C^T - C^T P [P^T P]^{-1} P^T] f \quad (19)$$

Equation (16) is a linear equation that can be solved using linear algebra techniques, for example, Cholesky factorization or conjugate gradient method. The solution of equation (18) provides the value of $\Delta x_c$. Using the value of $\Delta x_c$, the value of $\Delta x_p$ can be obtained by back substitution into equations (16) or (16), resulting in equations (20) and (21).

$$\Delta x_p = [P^T P]^{-1} [g_p - P^T C \Delta x_c] \quad (20)$$

$$\Delta x_p = [P^T P]^{-1} P^T [f - C \Delta x_c] \quad (21)$$

For problems with up to a few hundred images, the Schur complement S may be stored as a dense matrix and direct factorization methods may be applied to solve equation (18). However, as the number of become large, dense factorization may take significant time to solve and may not be a practical solution for a given amount of computing resources. Since most images only see a small fraction of the scene, the matrix S typically has substantial sparsity. In this case, it is useful to store S as a sparse matrix and use a sparse direct factorization algorithm.

While the use of the sparse direct factorization allows bundle adjustment algorithms to scale up to an order of magnitude or more (depending upon the sparsity pattern of S) than those based on direct factorization, this is still insufficient for very large problems. As the problem size increases further, the construction, storage and factorization of the Schur complement become prohibitive and exactly solving the normal equations becomes infeasible.

The solution obtained using a Cholesky factorization is the exact solution to the linear system $S\Delta x_c = r$, which in turn implies the exactly solution of $J\Delta x = f$. Typically, an exact solution of these equations may not be needed to solve the original non-linear problem. This is so because the equation (5) is itself obtained by an approximate linearization $$\frac{1}{2}\|F(x)\|^2 = \frac{1}{2}\|F(x) + J(x)\Delta x\|^2.$$

Embodiments solve the non-linear optimization problem using approximations, for example, inexact Newton or truncated Newton methods. These approximations perform two steps. The first step includes a method for approximately solving systems of linear equations. Typically an iterative linear solver, for example, the Conjugate Gradients method may be used for this purpose. The second step determines when to stop the iterations of the iterative solver based on a termination rule. A typical termination rule is of the form $$\|[J^T(x)J(x) + \mu D^T(x(D(x)]\Delta x + g(x)\| \le \eta_k \|f(x)\| \quad (22)$$

where, k is the iteration counter, $0 < \eta_k < 1$ is known as the forcing sequence that determines the convergence rate of the resulting iterative process. The term $J^T(x)J(x) + \mu D^T(x)D(x)$ is a symmetric positive definite matrix. Accordingly, the equation (13) can be solved using the conjugate gradients (CG) method or the minimum residual (MINRES) algorithms. Following discussion illustrates the solution of equation (13) using the conjugate gradients method, however other equation solution methods can also be used.

The convergence rate of the CG algorithm for solving (13), depends on the distribution of eigen values of H. In particular for a linear system, $Ax=b$, let $e_k = A^- b - x_k$ be the error in the solution vector after k iterations of the Conjugate Gradients algorithm, and $\|x\|_A = \langle x, A_x \rangle^{1/2}$, then $$\frac{\|e_k\|A}{\|e_0\|A} \le 2\left(\frac{\sqrt{k(A)} - 1}{\sqrt{k(A)} + 1}\right)^k \quad (23)$$

where, k(A) is the condition number of A.

Embodiments solve equation (13) by replacing the system of equations (13) with a preconditioned system. Given a linear system, $Ax=b$ and preconditioner $M=LL^T$, the preconditioned system is given by $M^{-1}A_x = M^{-1}b$. The worst case bound for this system of equations depends on the condition number of the preconditioned matrix $k(M^{-1}A) = k(A, M)$.

The significant computational cost in each iteration of the CG algorithm is evaluation of the matrix vector product $\beta = A\alpha$ for arbitrary vectors $\alpha$. In case of preconditioned conjugate gradients, the significant computational cost is the product $\beta = M^{-1}A\alpha$. In practice, instead of forming the matrix product $M^{-1}A$, and then applying it to $\alpha$, the matrix vector product is evaluated by solving the linear system $M\beta = A\alpha$. Thus, for preconditioned conjugate gradients method to be efficient, this linear system of equations should be more efficient to solve than the original system of equations $Ax=b$.

The ideal preconditioner is one for which $k(A\ M)=1$. This criteria is satisfied in case of $M=A$, but this is not a practical choice, as applying this preconditioner requires solving the original linear system. Embodiments use a preconditioner for solving bundle adjustment problems arising from user generated imagery. Instead of solving equation (13), embodiments use CG method to solve equation (24) approximately and then back substitute to obtain $x_p$.

$$S\Delta_{x_c} = r \quad (24)$$

System Environment and Architectural Overview

Figure 3:
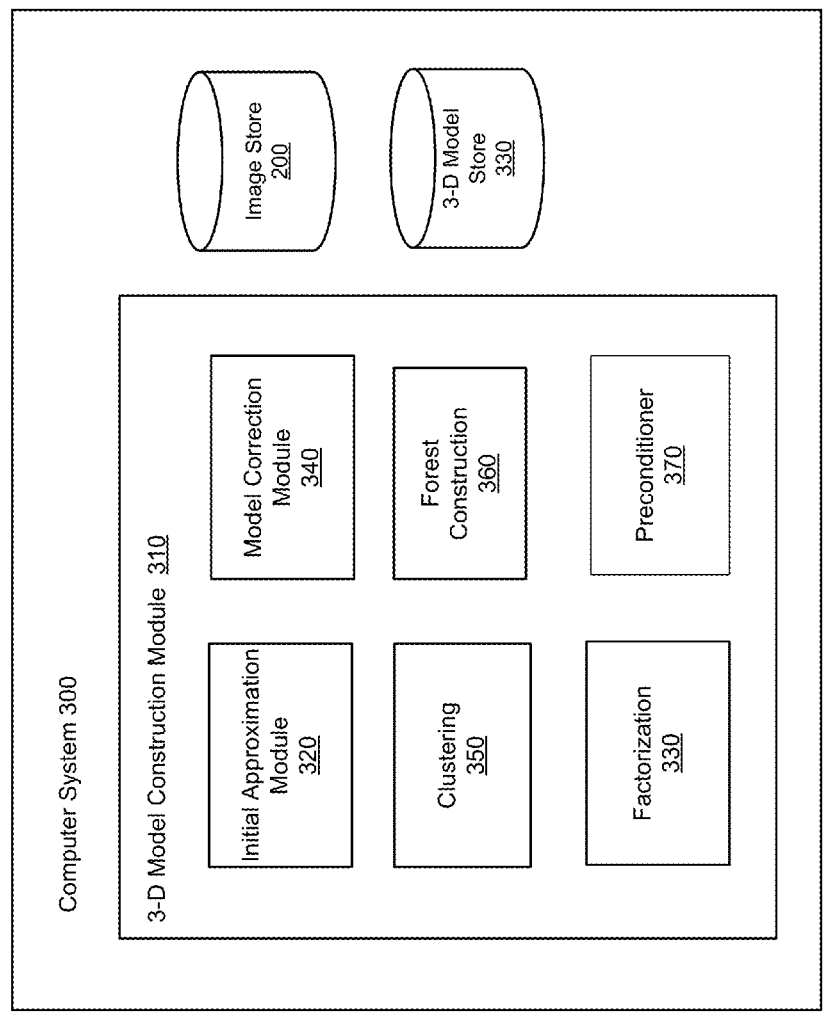
FIG. 3 is a high-level block diagram illustrating modules within a computer system for performing three-dimensional reconstruction of a scene, according to one embodiment of the present invention.

FIG. 3 is a high-level block diagram illustrating modules within a computer system 300 for performing three-dimensional reconstruction of a scene, according to one embodiment of the present invention. In one embodiment, the computer system 300 can be a conventional computer system executing, for example, a Microsoft Windows-compatible operating system (OS), Apple OS X, and/or a Linux distribution. In another embodiment, the computer system 300 can be a device having computer functionality, such as a personal digital assistant (PDA), mobile telephone, video game system, etc.

The computer system 300 comprises a three-dimensional (three-dimensional) model construction module 310, an image store 200, and a three-dimensional model store 330. Some embodiments of the computer system 300 have different and/or other modules than the ones described herein, and the functions can be distributed among the modules in a different manner than described here. For example, the computer system 300 might also include modules for receiving images via a network or modules for transmitting information describing the three-dimensional model via the network.

The image store 200 stores sets of images of scenes. The images can be, for example, still images or images contained in frames of a video. The images can show different types of entities such as buildings, people, animals, birds, trees, natural scenery or combinations of these. The images may be collected from different sources, for example, images uploaded by users of an image storage system, images obtained by professional stock photography, image galleries, and images specifically captured for purposes of three-dimensional model construction. The image store 200 typically stores sets of images for each entity, for example, different images of an entity captured from different angles. Examples of images stored in the image store 200 include images of buildings along a street captured by a moving car or images of inside of a building captured by a camera carried on a trolley within the building.

The three-dimensional model store 330 stores the three-dimensional models 220 generated by the three-dimensional model construction module 310 for describing various scenes. In an embodiment, the three-dimensional models 220 are represented as vectors comprising information describing the points of the scene and information describing the cameras 120 that captured the images. The information describing the points in a three-dimensional model may comprise positions of the points represented as three-dimensional coordinates. Information describing the cameras may comprise the position, orientation, and focal length of the cameras. The elements of the vectors that represent the point information are called the "point parameters" and the elements that represent the camera information are called the "camera parameters."

The three-dimensional model construction module 310 retrieves sets of images of a scene from the image store 200, reconstructs a three-dimensional model for the scene and stores the reconstructed three-dimensional model in the three-dimensional model store 330. The three-dimensional model construction module 310 module builds an initial approximation of the three-dimensional model for a scene, and iteratively improves upon the three-dimensional model to generate more and more accurate models of the scene. To this end, the three-dimensional model construction module 310 includes an initial approximation module 320, a model correction module 340, a clustering module 350, a forest construction module 360, a factorization module 330, and a preconditioner module 370.

The initial approximation module 320 generates an initial approximation of a three-dimensional model for representing a scene described by a set of images. Points of the scene may not be visible in every image of the scene. For example, a point of the scene may be visible in one image but not visible in another image. The initial approximation module 320 correlates the points from various images of a scene to determine a complete set of points of the scene that are observed in the different images of the scene.

In an embodiment, the camera equipment used for capturing the images may have a global positioning system (GPS) for determining initial approximations of the positions and orientations of the cameras. For example, the camera may be carried in a car or aircraft that captures pictures while it is moving. The car or aircraft carrying the camera may have GPS. The information obtained from the GPS may be stored along with the images in the image store 200. The initial approximation module 320 retrieves the camera positions as provided by the GPS and determines positions of the points of the scene by processing the camera positions, for example, by triangulation of points. The initial approximation module 320 may generate an approximate three-dimensional model and improve the three-dimensional model using simplified techniques that are not very computation intensive. In an embodiment, the initial approximation of the three-dimensional model is obtained from an external system. In this embodiment, the initial approximation module 320 receives the initial values of parameters of the three-dimensional model and assigns the received initial values to the parameters.

The model correction module 340 improves upon the initial approximation of the three-dimensional model by determining corrections to the three-dimensional model. In one embodiment, the model correction module 340 formulates the model reconstruction problem as a non-linear optimization problem and iteratively solves the non-linear optimization problem. Each iteration of the non-linear optimization problem determines a correction of the three-dimensional model. The model correction module 340 iteratively improves the three-dimensional model by updating the model using the correction of the model. The model correction module 340 uses certain convergence criteria to determine the number of iterations used for making corrections to the model. The final three-dimensional model of the scene generated by the model correction module 340 is stored in the three-dimensional model store 330.

The model correction module 340 invokes the clustering module 350, forest construction module 360, factorization module 330, and preconditioner module 370 to solve the linear system of equation (24) approximately. To solve the linear system of equations (24), the model correction module 340 performs clustering of images/cameras to identify a sub-matrix of S say M, which can be factorized cheaply because it is either block diagonal or block tridiagonal and yet an effective approximation of the matrix S, which in turn implies that $M^{-1}$ is a good approximation of $S^{-1}$.

Figure 4:
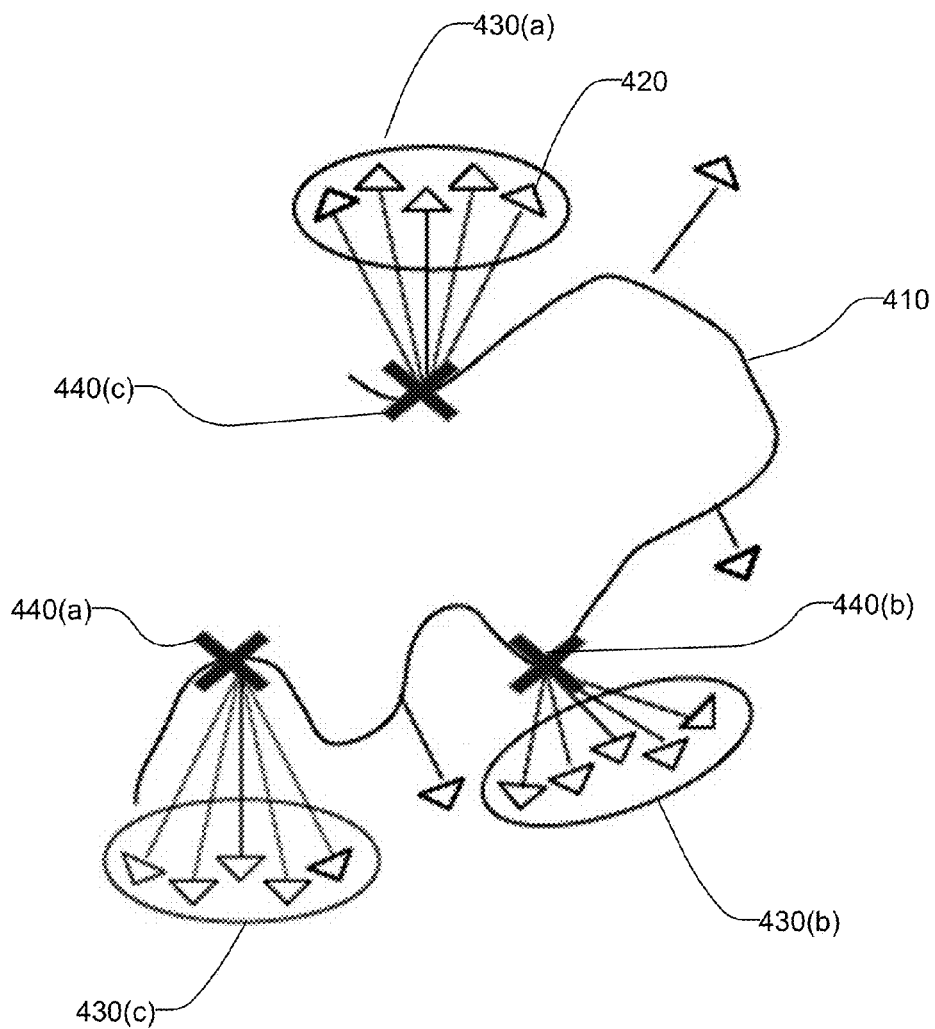
FIG. 4 illustrates a scene with portions of the scene captured by clusters of cameras.

The clustering module 350 performs clustering of the cameras such that cameras that observe significantly overlapping portion of the scene belong to a cluster. A characteristic of images from sets of photos of a scene, for example, internet photo collections or user generated content is that many of the images come in clusters. Examples of user generated content include images obtained from websites that allow users to upload pictures taken by their personal cameras. Images of a scene may also be captured by an organization, for example, by a flying airplane or by a street car with a mounted camera. FIG. 4 illustrates a scene with portions of the scene captured by clusters of cameras. The figure illustrates a scene 410 and several cameras 420 that captured pictures of various portions 440 of the scene. A portion of scene 440 may represent a popular point of interest like entrances to landmarks, historically interesting spots etc. These popular points are typically captured by several cameras, for example, the cluster 430 of cameras.

These clusters of cameras can be correlated with portions of the matrix S. The entries of matrix S are non-zero if a pair of cameras/images have at least one three-dimensional point in common. Thus, these clusters of viewpoints correspond to dense (non-zero) blocks in the matrix S. Furthermore, if two popular views are compared, it is very common, that there is little to no interaction between images from two different view-points unless they are really close by, as shown in FIG. 4. This is so because the physical world is opaque and points of one portion of a scene that are visible from one view point are not likely to be visible from a different view point. The clustering module 350 clusters the cameras such that cameras that observe same sets of points or significantly overlapping sets of points of the scene belong to a cluster.

In an embodiment, the clustering module 350 represents cameras as binary visibility vectors of length $n_p$, where $n_p$ is the number of three-dimensional points. Thus, the binary vector describing a camera has entries for each of the three-dimensional points with a one if the camera observes that three-dimensional point and a zero otherwise. Two cameras are similar if they have a large number of ones at the same locations, i.e., they observe the same set of three-dimensional points or a significantly overlapping sets of three-dimensional points. The clustering module 350 can use various clustering techniques to cluster the cameras represented as binary vectors. For example, clustering module 350 can use k-means clustering methods to determine clusters of cameras. For a k-means clustering method, if t is the maximum size of each cluster desired, the number of clusters k is set to $n_c/t$. Another clustering method that can be used by the clustering module 350 is affinity propagation method with the similarity between two cameras defined as the number of three-dimensional points common between them. The affinity between two cameras can be determined as the dot product between the binary visibility vectors corresponding to the two cameras. Another method that can be used by the clustering module 350 is spectral clustering with the same similarity measure as affinity propagation.

Figure 5A:
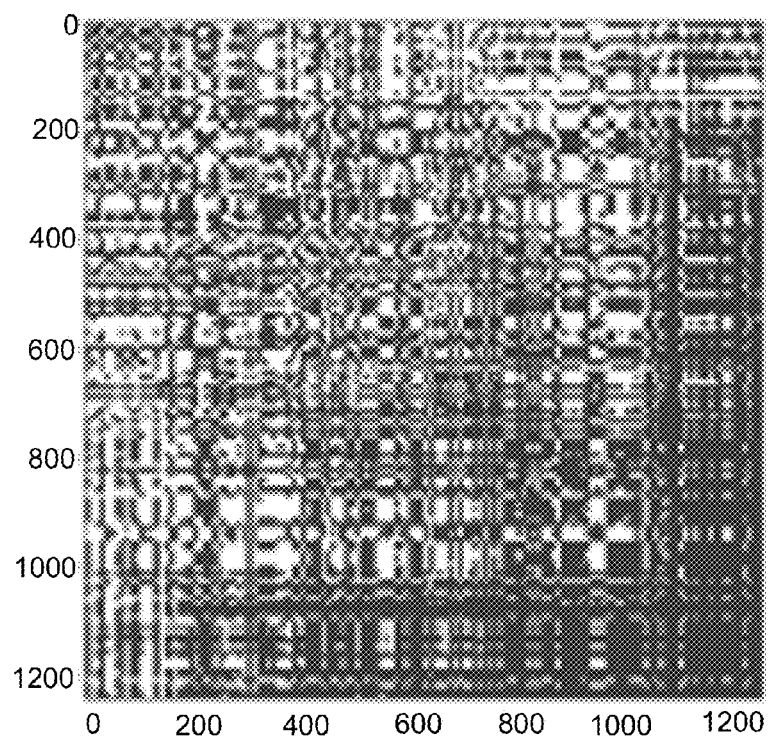
FIG. 5(a) illustrates the structure of the Schur complement matrix S before permuting the matrix based on clusters of cameras, in accordance with an embodiment of the invention.
Figure 5B:
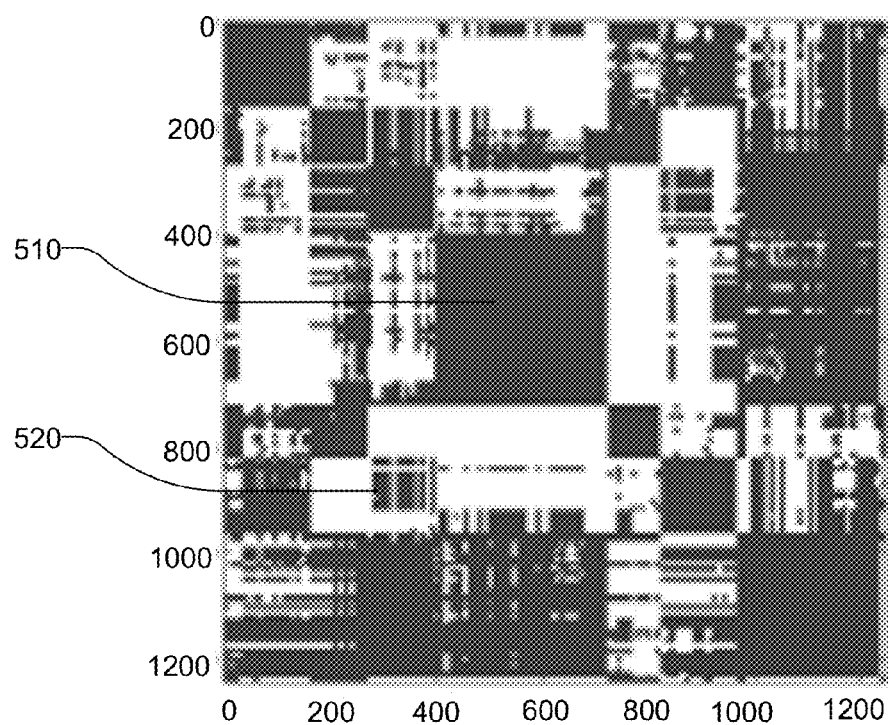
FIG. 5(b) illustrates the structure of the Schur complement matrix S after permuting the matrix based on clusters of cameras, in accordance with an embodiment of the invention.

Once we have the clusters, we use this clustering to come up with a permutation of S. This permutation is an ordering where all the cameras in cluster 1 are listed, followed by the cameras in cluster 2 and so on. FIG. 5(a) illustrates the S matrix before the permutation is performed and FIG. 5(b) illustrates the structure of the Schur complement matrix S after the permutation. The goal of the permutation process is to bring most of the non-zero terms of the matrix close to the diagonal as diagonal blocks 510 so as to reduce the number of off-diagonal blocks 520, as shown in FIG. 5(*b*).

The forest construction module 360 modifies the S matrix so as to reduce terms corresponding to off diagonal blocks in the permuted matrix S. The off-diagonal blocks 520 correspond to interactions between cameras of different clusters, for example, if a camera from one cluster observes a point of a portion of the scene observed by cameras of another cluster. If all the off diagonal blocks of the permuted matrix S are added to M, the cost of factorizing M would be the same as that of factorizing S and there would be no performance improvement as a result of preconditioning. Instead, the forest construction module 360 adds off diagonal blocks which capture significant interaction between clusters leading to an easily factorizable matrix M. In some embodiments, the forest construction module 360 determines whether to perform the step of elimination of terms of the linear system of equations based on an analysis of the structure of the S matrix. For example, the forest construction module 360 performs this step if there are significant non-zero off diagonal entries of the matrix and skips this step if the number of non-zero entries is below a threshold.

In an embodiment, the forest construction module 360 constructs a weighted graph G in which each cluster corresponds to a vertex and vertices are connected by weighted edges. The weight of an edge is used to quantify the interaction between 2 clusters. Let $n_i$ denote the number of points seen by the cameras in cluster i, and $n_{ij}$ denote the number of points seen by at least one camera in both the clusters i and j. The weight of the edge between cluster i and cluster j is represented by equation (25).

$$w_{ij} = \frac{n_{ij}}{2n_i n_j}(n_i + n_j) \quad (25)$$

Figure 6:
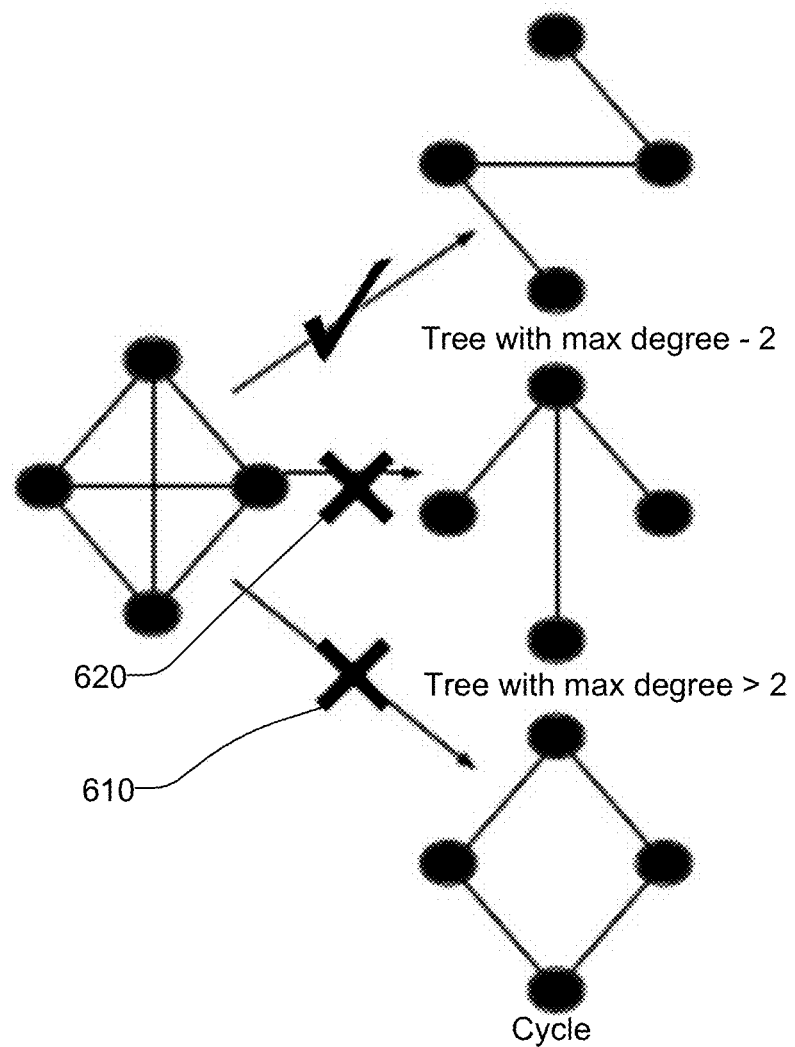
FIG. 6 illustrates the criteria for determining whether an edge of the S matrix is retained in the preconditioned matrix M, in accordance with an embodiment of the invention.

Equation (25) captures how many points are observed by the cameras in the two clusters together, normalized appropriately by the harmonic mean of the number of points observed by the cameras in the individual clusters. FIG. 6 illustrates the criteria for determining whether an edge of the S matrix is retained in the preconditioned matrix M, in accordance with an embodiment of the invention. Given an input graph G, the forest construction module 360 iterates over its edges in decreasing order of weight adding them to a new graph G' while checking following conditions, as shown FIG. 6. The first condition checks whether adding 610 the edge creates a cycle in G'. If addition of the edge creates a cycle in the resulting graph G' the edge is not added to the resulting graph G'. The second condition checks whether adding 620 the edge causes the degree of a vertex to exceed two. If the addition of the edge causes the degree of a vertex to exceed two, the edge is not added to the resulting graph G'. As a result, degree of every vertex in graph G' is bounded by two.

Given the resulting graph G', the forest construction module 360 can construct the preconditioner matrix M such that it contains all the diagonal blocks corresponding to the clusters and off diagonal blocks if the vertices corresponding to the clusters are connected by an edge in G'. The first condition ensures that the sparse Cholesky factorization of M has the same sparsity structure as M, i.e., there is zero fill of terms in as a result of performing Cholesky factorization. The second condition ensures that M is positive semi-definite, which means that the matrix M can be further permuted into a block tri-diagonal matrix.

The factorization module 330 performs factorization of the resultant approximation $M=LL^T$. To do this, the factorization module 330 determines an elimination ordering for the nodes in the graph G', or in other words the clusters in M. After that, the factorization module 330 executes block Cholesky factorization on the forest structure according to the elimination order. A consequence of the degree 2 requirement is that the structure of the Cholesky factor is same as the upper triangular part of M, i.e., there is no additional fill-in.

Figure 7:
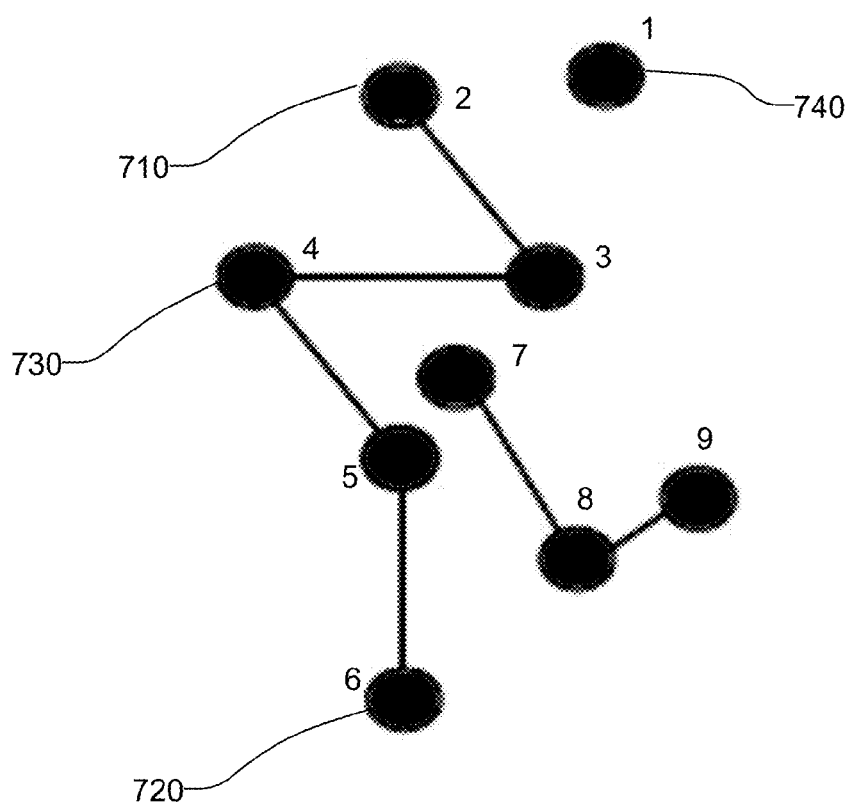
FIG. 7 illustrates an ordering of the vertices of the graph representing the approximation matrix, in accordance with an embodiment of the invention.

FIG. 7 illustrates an ordering of the vertices of the graph representing the approximation matrix, in accordance with an embodiment of the invention. The structure of the resulting graph G' as a forest with degree two implies that the graph can be decomposed as a set of disjoint paths without any cycles. Thus each path, corresponding to each connected component, has exactly two nodes with degree one, i.e., a start node 710 and an end node 720 and all other nodes 730 have degree exactly two, in addition to possibly isolated nodes 740. The factorization module 330 determines an elimination ordering for the clusters before factorizing the approximation. The factorization module 330 determines the ordering by first listing all the isolated nodes, followed by traversing each path, for example, starting from a degree 1 vertex and ending with the other degree 1 vertex and listing the vertices in order.

Figure 8A:
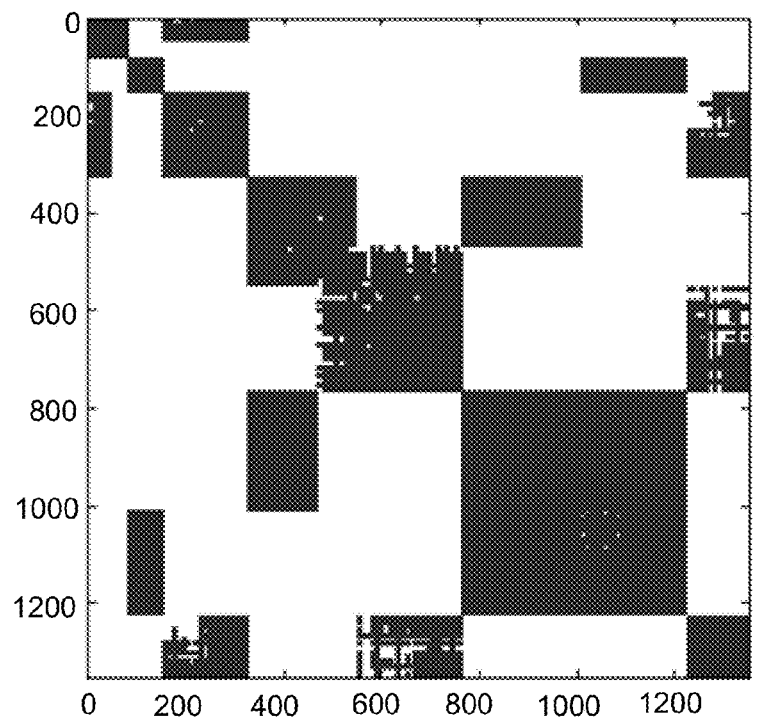
FIG. 8(a) illustrates a matrix corresponding to the structure of graph G' according to an embodiment of the invention, in accordance with an embodiment of the invention.
Figure 8B:
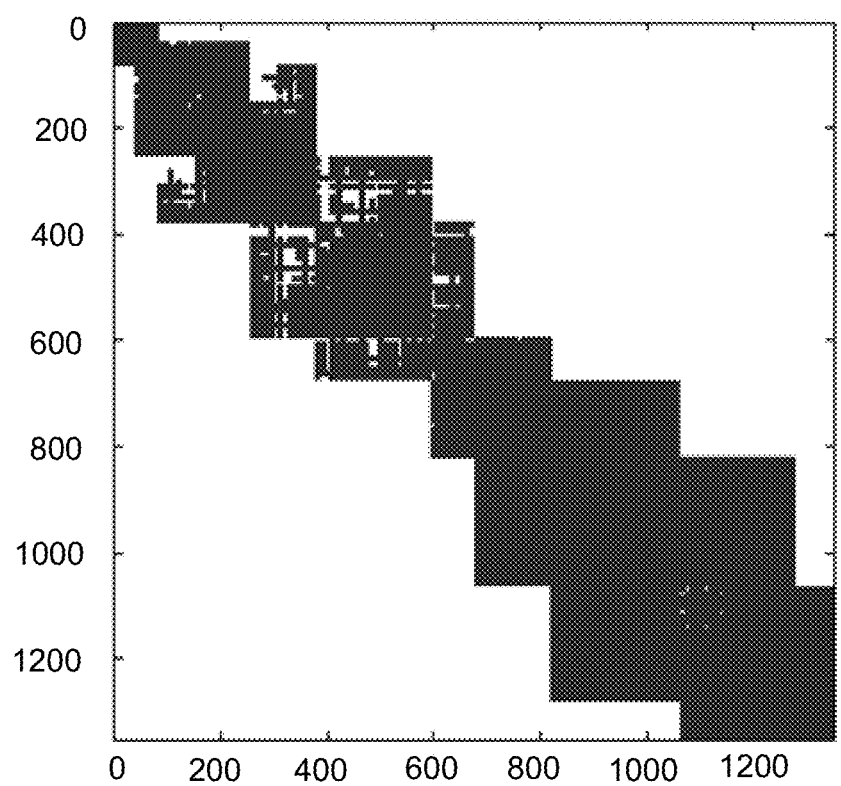
FIG. 8(b) illustrates the matrix of FIG. 8(a) after being permuted based on the elimination ordering, in accordance with an embodiment of the invention.
Figure 8C:
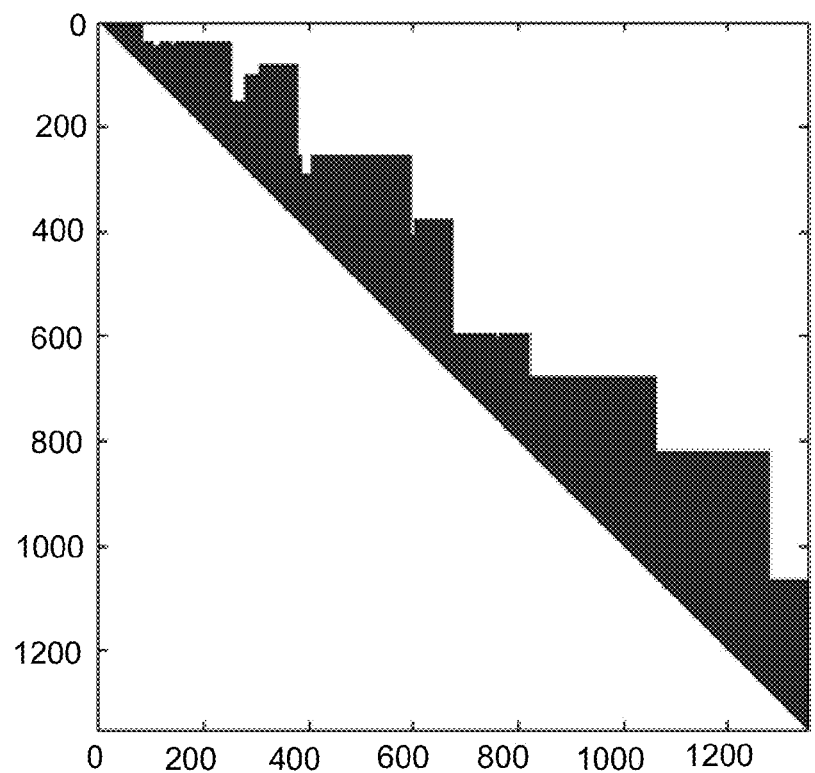
FIG. 8(c) illustrates the result of performing Cholesky factorization on the matrix of FIG. 8(b), in accordance with an embodiment of the invention.

FIG. 7 illustrates an example ordering of the vertices of the graph representing the approximation matrix. The factorization module 330 uses the elimination order to permute the matrix so that the clusters are arranged in the order in which they will be eliminated. Under this ordering, two clusters are connected in G', only if they occur as consecutive indices in the ordering. FIG. 8(*a*) illustrates a matrix corresponding to the structure of graph G'. FIG. 8(*b*) illustrates the matrix of FIG. 8(*a*) after being permuted based on the elimination ordering. Thus permuting the clusters in this way leads to a block tri-diagonal approximation of the original matrix, as shown in FIG. 8(*b*).

The factorization module 330 computes the Cholesky factorization for this matrix, by computing the Cholesky factorization for each individual cluster and propagating the effect to the next cluster in the elimination ordering and so on. This way, the factorization module 330 exploits the tree structure of the matrix while performing the sparse Cholesky factorization. FIG. 8(*c*) illustrates the result of performing Cholesky factorization on the matrix of FIG. 8(*b*), in accordance with an embodiment of the invention.

The factorization module 330 stores the Cholesky factor comprising a block upper triangular matrix as a concatenation of the blocks including both diagonal and off diagonal blocks. The factorization module 330 also maintains pointers to the start of each cluster pair block so there is a quick and direct access to the entries corresponding to a cluster pair. Each block is assumed to be dense and stored as an array of size equal to number of rows multiplied by the number columns.

Figure 9A:
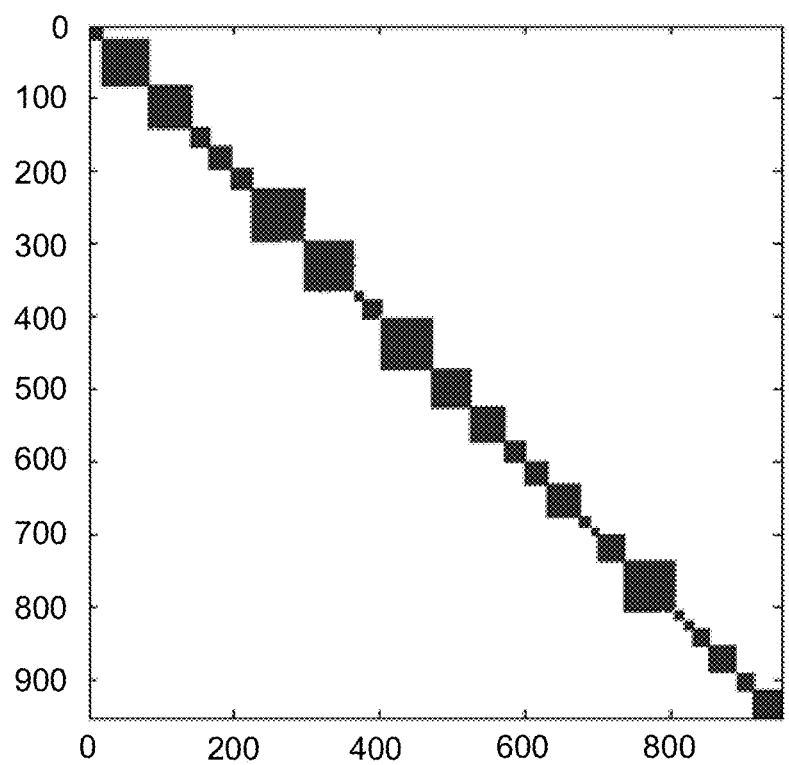
FIG. 9(a) shows a preconditioner with only diagonal blocks, in accordance with an embodiment of the invention.
Figure 9B:
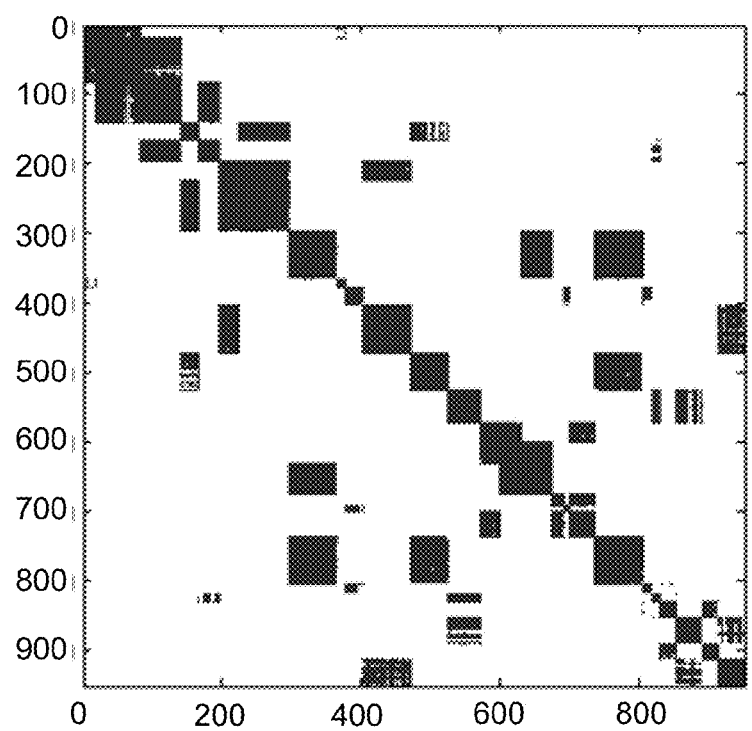
FIG. 9(b) shows a preconditioner with both diagonal and off-diagonal blocks, in accordance with an embodiment of the invention.

The preconditioner 370 uses this approximation M as the preconditioner for the system of equations (24). FIG. 9 shows the two preconditioners, with and without the off-diagonal blocks. FIG. 9(*a*) shows a preconditioner with only diagonal blocks and FIG. 9(*b*) shows a preconditioner with both diagonal and off-diagonal blocks. As M is an approximation for S, we would expect the condition number of $S'^{-1}S$ to be low, i.e., the problem would be better conditioned than equations (24). In each iteration of the preconditioned conjugate gradient method the preconditioner 370 solves the system $M_x=y$, or $LL^T x=y$, after the matrix M is factorized to $LL^T$. This step is a forward elimination Lz=y where z is a set of variables, followed by a backward elimination $L^T x=z$, which can be performed efficiently.

Reconstructing the Three-Dimensional Model

Figure 10:
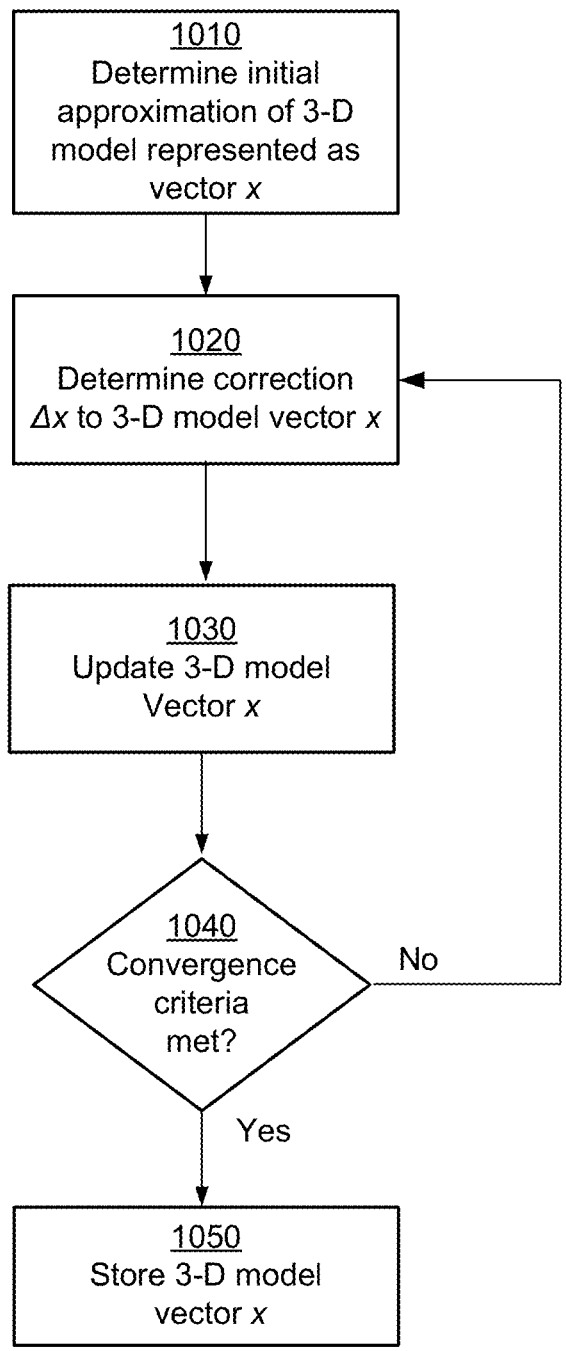
FIG. 10 is a flow diagram illustrating the overall process for reconstructing a three-dimensional model of a scene from a set of images, according to one embodiment of the invention.

FIG. 10 is a flow diagram illustrating the overall process for reconstructing a three-dimensional model of a scene from a set of images performed by the three-dimensional model construction module 310, according to one embodiment of the invention. The initial approximation module 320 determines 1010 an initial approximation of the three-dimensional model 220. In an embodiment, the initial approximation module 320 retrieves a set of images of a scene from the image store 200 and determines an initial approximation to the three-dimensional model describing the scene by processing the information describing the images, for example, the positions and orientations of the cameras if available. The initial approximation module 320 may represent the initial approximation of the three-dimensional model as a block structured vector x like that shown in equation (1). The initial approximation module 320 may either store the representation of the initial approximation in the three-dimensional model store 330 for further processing or pass the initial approximation representation to the model correction module 340 as a parameter.

The model correction module 340 determines 1020 a correction $\Delta x$ to the set of parameters representing the initial approximation of the three-dimensional model. In an embodiment, determining 1020 the correction $\Delta x$ comprises formulating a linear system of equations corresponding to equation (10), i.e. $J\Delta x=f$ and solving the formulated linear system of equations. The model correction module 340 updates 1030 the three-dimensional model based on the correction $\Delta x$.

The model correction module 340 iteratively repeats the steps of determining 1020 the correction $\Delta x$ to the set of parameters representing the three-dimensional model and updating 1030 the representation of the three-dimensional model until certain convergence criteria are met 1040. The model correction module 340 refines the set of parameters representing the three-dimensional model by updating the set of parameters based on the corrections to the set of parameters to produce a refined three-dimensional model of the scene. The convergence criteria may comprise verifying 1040 that the correction value $\Delta x$ is below a predetermined threshold value. In an embodiment, the convergence criterion determines whether an aggregate measure based on the correction value $\Delta x$ is below a threshold predetermined value. Accordingly, the model correction module 340 continues correcting the three-dimensional model while a significant improvement is obtained by correcting the model. In other embodiments, the model correction module 340 may repeat the steps 1020, 1030, and 1040 a predetermined number of times. The model correction module 340 stores the final representation x of the three-dimensional model in the three-dimensional model store 330. In some embodiments, the model correction module 340 may store intermediate representations, for example, values of vector x after each iteration.

Figure 11:
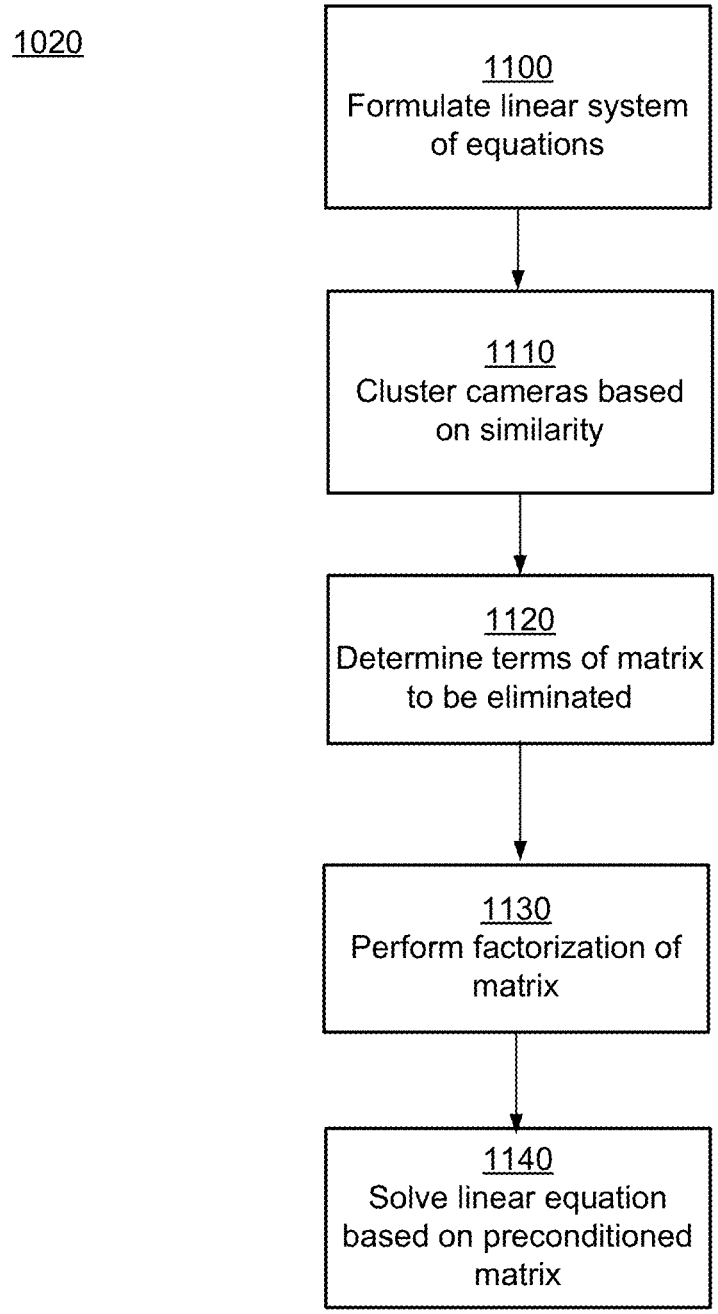
FIG. 11 is a flow diagram illustrating the process for solving the linear equations based on a preconditioner, according to one embodiment of the invention.

FIG. 11 is a flow diagram illustrating the process for solving the linear equations based on a preconditioner, according to an embodiment of the invention. As shown in FIG. 11, the model correction module 340 formulates 1100 the linear system of equations based on equation (10), i.e. $J\Delta x=f$. The clustering module 350 clusters 1110 the cameras used for capturing pictures of the scene based on similarity of cameras. The clustering module 350 determines similarity of cameras based on an overlap between sets of points of the scene that are observed from the camera. The forest construction module 360 determines 1120 terms of the linear system of equations being solved that can be eliminated and eliminates them. The forest construction module 360 also permutes the matrix to obtain a diagonal or tri-diagonal matrix. The factorization module 330 performs 1130 the factorization of the resulting matrix for example, using sparse Cholesky factorization. Other embodiments can use sparse QR factorization. The preconditioner 370 uses the result of the factorization as a preconditioner for solving the linear system of equations. The preconditioner 370 determines a preconditioned linear system of equations by applying the preconditioner matrix to the linear system of equations. The preconditioner 370 solves 1140 the preconditioned linear system of equations, for example, using a preconditioned conjugate gradient method.

The techniques disclosed herein can be used for applications in computer vision, for example, three-dimensional reconstruction. Another use of the techniques disclosed include match-moving for adding special effects to movies. Besides computer vision, the techniques disclosed herein can be used for robotics work and self localization and mapping (SLAM) work. The techniques disclosed herein can be used to create three-dimensional models used for creating special effects for movies, to refine imagery captured from street view or airplanes, or for building three dimensional models for a system for providing photo tours.

Computer Architecture

Figure 12:
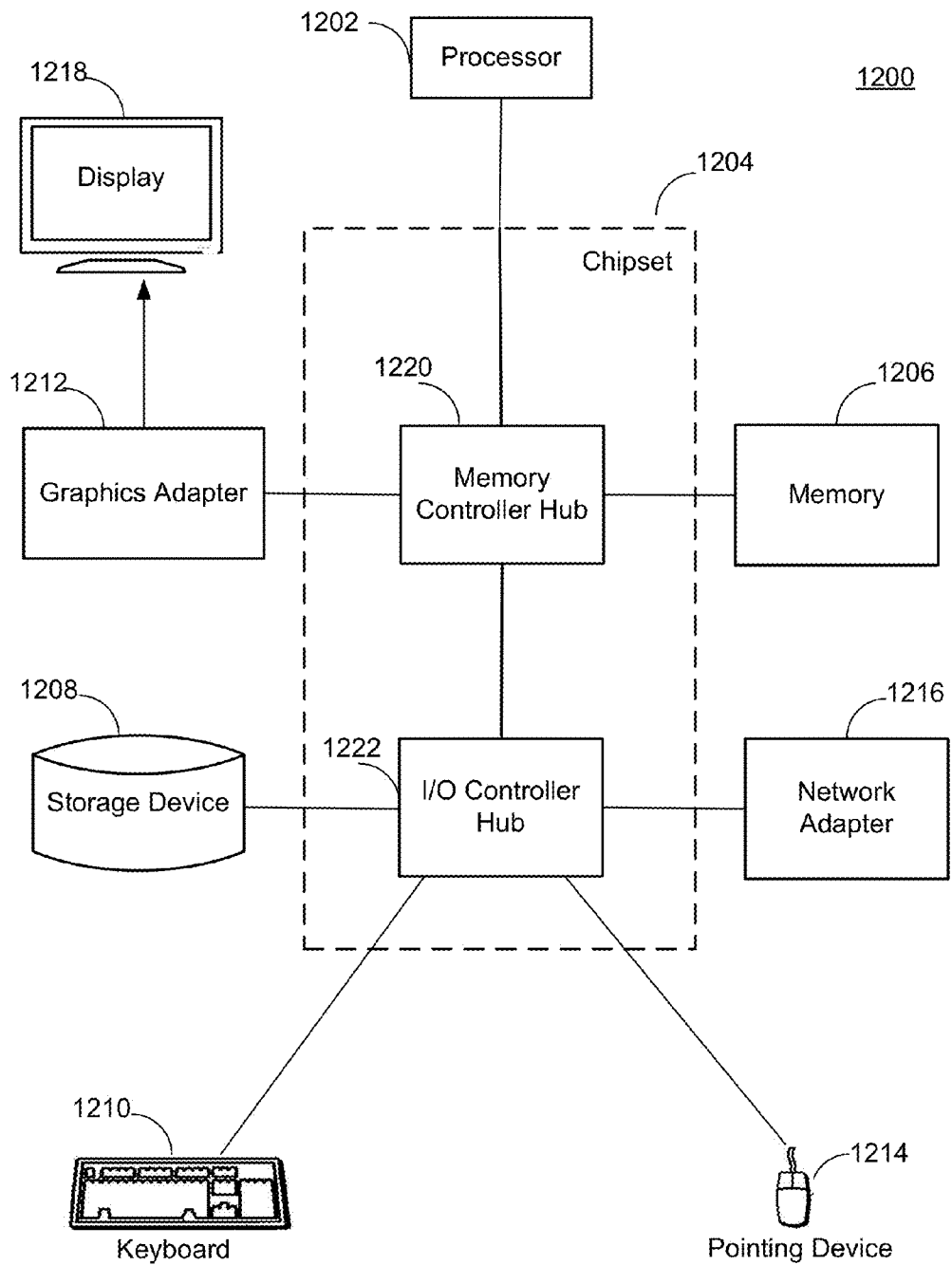
FIG. 12 is a high-level block diagram illustrating an example of a computer system shown in FIG. 3 according to one embodiment of the present invention.

FIG. 12 is a high-level block diagram illustrating an example computer 1200, such as the computer system 300 shown in FIG. 3. The computer 1200 includes at least one processor 1202 coupled to a chipset 1204. The chipset 1204 includes a memory controller hub 1220 and an input/output (I/O) controller hub 1222. A memory 1206 and a graphics adapter 1212 are coupled to the memory controller hub 1220, and a display 1218 is coupled to the graphics adapter 1212. A storage device 1208, keyboard 1210, pointing device 1214, and network adapter 1216 are coupled to the I/O controller hub 1222. Other embodiments of the computer 1200 have different architectures.

The storage device 1208 is a non-transitory computer-readable storage medium such as a hard drive, compact disk read-only memory (CD-ROM), DVD, or a solid-state memory device. The memory 1206 holds instructions and data used by the processor 1202. In an embodiment, the memory 1206 is a random access memory (RAM) that has faster access time compared to a storage device 1208, for example, hard drive, CD-ROM or DVD. Typically, the total storage capacity of storage device 1208 is much larger than the total storage capacity of memory 1206. If a process uses a large amount of data, the memory 1206 may not be large enough to accommodate all the data used by the process. Frequently used data may be stored in memory 1206 for fast access in order to improve overall performance. The pointing device 1214 is a mouse, track ball, or other type of pointing device, and is used in combination with the keyboard 1210 to input data into the computer system 1200. The graphics adapter 1212 displays images and other information on the display 1218. The network adapter 1216 couples the computer system 1200 to one or more computer networks.

The computer 1200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 1208, loaded into the memory 1206, and executed by the processor 1202.

The types of computers 1200 used as the computer systems of FIG. 3 can vary depending upon the embodiment and requirements. In some embodiments, the computer system 300 might include one or more blade computers lacking displays, keyboards, and/or other devices shown in FIG. 12. In other embodiments, the computer system 300 might comprise a mobile phone or other such device with a touch-sensitive display and limited processing power.

Alternative Embodiments

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for reconstructing a three-dimensional model from a given set of images of a scene. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for refining a three-dimensional model of a scene from a set of images of the scene captured using a set of cameras, the method comprising:
    iteratively modifying a set of parameters representing the three-dimensional model of the scene, the set of parameters comprising observations of the scene from the set of cameras, each camera associated with a set of points of the scene observed from the camera, the modifying comprising:
        determining corrections to the set of parameters, comprising, for an iteration:
            formulating a linear system of equations representing an error in the three dimensional model;
            determining clusters of cameras, each cluster associated with a portion of the scene and comprising cameras from the set of cameras that observe the portion of the scene;
            determining a preconditioner matrix by:
                for each pair of clusters, determining a number of terms of the linear system of equations representing interactions between clusters of the pair;
                selecting pairs of clusters based on the number of terms representing interactions between clusters of each pair; and
                forming the preconditioner matrix by eliminating one or more terms of the linear system of equations representing interactions between clusters of the selected pairs;
            preconditioning the linear system of equations using the preconditioner matrix and solving the preconditioned linear system of equations to determine corrections to the set of parameters;
        refining the set of parameters based on the corrections to the set of parameters to produce a refined three-dimensional model of the scene; and
        storing the refined three-dimensional model.

2. The method of claim 1, wherein clusters of the cameras are determined based on a degree of overlap of sets of points observed by each camera.

3. The method of claim 2, further comprising:
    representing each camera as a vector describing points observed from the camera; and
    comparing the vectors associated with each camera to determine overlap in the sets of points observed by each camera.

4. The method of claim 1, wherein clusters of cameras are determined by k-means clustering.

5. The method of claim 1, wherein determining corrections to the set of parameters further comprises:
    permuting the linear system of equations to arrange terms of the linear system of equations corresponding to each cluster of cameras together.

6. The method of claim 5, wherein the one or more terms that are eliminated correspond to cross diagonal blocks of the permuted linear system of equations.

7. The method of claim 1, wherein selecting pairs of clusters comprises:
preferring a first pair of clusters over a second pair of clusters responsive to the number of terms representing interactions between clusters of the first pair being less than the number of terms representing interactions between clusters of the second pair.

8. The method of claim 1, wherein eliminating the one or more terms of the linear system of equations comprises:
representing clusters of cameras as a weighted graph, wherein each node of the graph represents a cluster and each edge represents interactions across clusters connected by the edge, each edge having a weight proportional to the number of points observed by cameras from both the clusters connected by the edge; and
preferring lower weight edges for elimination of terms of the linear system of equations.

9. The method of claim 8, wherein a weight of an edge connecting a pair of clusters is normalized by a harmonic mean of the number of points observed individually by cameras of each cluster connected by the edge.

10. The method of claim 1, wherein eliminating one or more terms of the linear system of equations comprises:
representing clusters of cameras as a graph, each node of the graph representing a cluster and each edge representing interactions across a pair of clusters connected by the edge; and
eliminating edges of the graph such that the resulting graph has nodes with at most two edges.

11. The method of claim 10, wherein eliminating the one or more terms of the linear system of equations further comprises:
eliminating edges of the graph such that the resulting graph is a tree.

12. A computer-implemented system for constructing a three-dimensional model of a scene from a set of images of the scene captured using a set of cameras, the system comprising:
a computer processor; and
a computer-readable storage medium storing computer program modules configured to execute on the computer processor, the computer program modules comprising:
a model correction module configured to:
iteratively modify a set of parameters representing the three-dimensional model of the scene, the set of parameters comprising observations of the scene from the set of cameras, each camera associated with a set of points of the scene observed from the camera, the modifying comprising:
determining corrections to the set of parameters, comprising, for an iteration:
formulating a linear system of equations representing an error in the three dimensional model;
determining clusters of cameras, each cluster associated with a portion of the scene and comprising cameras from the set of cameras that observe the portion of the scene;
determining a preconditioner matrix by:
for each pair of clusters, determining a number of terms of the linear system of equations representing interactions between clusters of the pair;
selecting pairs of clusters based on the number of terms representing interactions between clusters of each pair; and
forming the preconditioner matrix by eliminating one or more terms of the linear system of equations representing interactions between clusters of the selected pairs;
preconditioning the linear system of equations using the preconditioner matrix and solving the preconditioned linear system of equations to determine corrections to the set of parameters; and
refining the set of parameters based on the corrections to the set of parameters to produce a refined three-dimensional model of the scene; and
a three-dimensional model construction module configured to store the refined three-dimensional model of the scene.

13. The system of claim 12, wherein the model correction module is configured to determine clusters of the cameras based on a degree of overlap of sets of points observed by each camera.

14. The system of claim 12, wherein determining corrections to the set of parameters further comprises:
permuting the linear system of equations to arrange terms of the linear system of equations corresponding to each cluster of cameras together.

15. The system of claim 14, wherein the one or more terms of the linear system of equations that are eliminated correspond to cross diagonal blocks of the permuted linear system of equations.

16. A computer program product having a non-transitory computer-readable storage medium storing computer-executable code for constructing a three-dimensional model of a scene from a set of images of the scene captured using a set of cameras, the code comprising:
a model correction module configured to:
iteratively modify a set of parameters representing the three-dimensional model of the scene, the set of parameters comprising observations of the scene from the set of cameras, each camera associated with a set of points of the scene observed from the camera, the modifying comprising:
determining corrections to the set of parameters, comprising, for an iteration:
formulating a linear system of equations representing an error in the three dimensional model;
determining clusters of cameras, each cluster associated with a portion of the scene and comprising cameras from the set of cameras that observe the portion of the scene;
determining a preconditioner matrix by:
for each pair of clusters, determining a number of terms of the linear system of equations representing interactions between clusters of the pair;
selecting pairs of clusters based on the number of terms representing interactions between clusters of each pair; and
forming the preconditioner matrix by eliminating one or more terms of the linear system of equations representing interactions between clusters of the selected pairs;
preconditioning the linear system of equations using the preconditioner matrix and solving the preconditioned linear system of equations to determine corrections to the set of parameters; and
refining the set of parameters based on the corrections to the set of parameters to produce a refined three-dimensional model of the scene; and
a three-dimensional model construction module configured to store the refined three-dimensional model of the scene.

17. The computer program product of claim 16, wherein the model correction module is configured to determine clusters of the cameras based on a degree of overlap of sets of points observed by each camera.

18. The computer program product of claim 16, wherein determining corrections to the set of parameters further comprises:
   permuting the linear system of equations to arrange terms of the linear system of equations corresponding to each cluster of cameras together.

19. The computer program product of claim 18, wherein the one or more terms of the linear system of equations that are eliminated correspond to cross diagonal blocks of the permuted linear system of equations.

* * * * *